(12) United States Patent
Komori et al.

(10) Patent No.: US 9,375,890 B2
(45) Date of Patent: Jun. 28, 2016

(54) EXTRUSION-MOLDING DEVICE AND METHOD FOR PRODUCING MOLDED BODY USING SAME

(75) Inventors: Teruo Komori, Niihama (JP); Hajime Yoshino, Niihama (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 93 days.

(21) Appl. No.: 13/703,443

(22) PCT Filed: Jun. 16, 2011

(86) PCT No.: PCT/JP2011/063850
§ 371 (c)(1),
(2), (4) Date: Dec. 11, 2012

(87) PCT Pub. No.: WO2011/158916
PCT Pub. Date: Dec. 22, 2011

(65) Prior Publication Data
US 2013/0099412 A1    Apr. 25, 2013

(30) Foreign Application Priority Data
Jun. 17, 2010    (JP) .................................. 2010-138351

(51) Int. Cl.
*B28B 3/22*    (2006.01)
*B28B 3/26*    (2006.01)
(Continued)

(52) U.S. Cl.
CPC ............ *B29D 99/0089* (2013.01); *B28B 3/206* (2013.01); *B29C 47/0028* (2013.01);
(Continued)

(58) Field of Classification Search
CPC .......... B28B 3/203; B28B 3/206; B28B 3/22; B29C 47/0028; B29C 47/0066; B29C 47/12; B29C 47/362; B29C 47/705; B29C 47/686

USPC ........ 264/177.12, 211.21; 425/197, 198, 199, 425/380, 467
See application file for complete search history.

(56) References Cited

U.S. PATENT DOCUMENTS

| 2,990,576 A * | 7/1961 | Van Riper ..................... 425/197 |
| 3,018,807 A * | 1/1962 | Clinefelter ............ B29C 47/686 425/191 |

(Continued)

FOREIGN PATENT DOCUMENTS

| GB | 1319271 A | 6/1973 |
| JP | 61-005915 A | 1/1986 |

(Continued)

OTHER PUBLICATIONS

Extended European Search Report issued Jan. 22, 2014 in counterpart European Patent Application No. 11795818.1.
(Continued)

*Primary Examiner* — Yogendra Gupta
*Assistant Examiner* — Joseph Leyson
(74) *Attorney, Agent, or Firm* — Sughrue Mion, PLLC (57) ABSTRACT

The extrusion-molding device of the invention includes a flow passage for transporting a paste raw material composition; a screw provided at an upstream side of the flow passage to knead the raw material composition and transport it to a downstream side; a die provided at a downstream side of the flow passage to extrude a molded body composed of the raw material composition therefrom; a resistive tube for connecting the flow passage and the die; and a current plate provided between the screw and the die. The current plate comprises a plurality of through-holes that penetrate from a upstream end side to a downstream end side, and an opening of the through-hole on the upstream end side has a larger open area than an opening on the downstream end side.

5 Claims, 5 Drawing Sheets (51) Int. Cl.
  *B29C 47/70* (2006.01)
  *B29D 99/00* (2010.01)
  *B29C 47/12* (2006.01)
  *B29C 47/00* (2006.01)
  *B29C 47/36* (2006.01)
  *B29C 47/50* (2006.01)
  *B29C 47/60* (2006.01)
  *B29C 47/20* (2006.01)
  *B28B 3/20* (2006.01)
  *B29C 47/76* (2006.01)

(52) U.S. Cl.
  CPC .............. *B29C47/12* (2013.01); *B29C 47/20* (2013.01); *B29C 47/362* (2013.01); *B29C 47/366* (2013.01); *B29C 47/50* (2013.01); *B29C 47/6012* (2013.01); *B28B 3/22* (2013.01); *B28B 2003/203* (2013.01); *B29C 47/0066* (2013.01); *B29C 47/705* (2013.01); *B29C 47/765* (2013.01)

(56) References Cited

U.S. PATENT DOCUMENTS

| | | | | |
|---|---|---|---|---|
| 3,888,963 | A * | 6/1975 | Orso et al. | 264/211.11 |
| 3,981,657 | A | 9/1976 | Orso et al. | |
| 4,364,888 | A * | 12/1982 | Levin | 264/177.12 |
| 2005/0046072 | A1 * | 3/2005 | Shalkey | 264/169 |
| 2010/0025884 | A1 | 2/2010 | Okazaki | |

FOREIGN PATENT DOCUMENTS

| | | |
|---|---|---|
| JP | 05-016135 A | 1/1993 |
| JP | 11-077636 A | 3/1999 |
| JP | 11070303 A | 3/1999 |
| JP | 2007-038636 A | 2/2007 |
| JP | 2008-137186 A | 6/2008 |
| JP | 4099896 B2 | 6/2008 |
| WO | 2008126450 A1 | 10/2008 |
| WO | 2011/158914 A1 | 12/2011 |

OTHER PUBLICATIONS

International Preliminary Report on Patentability and Written Opinion mailed Jan. 24, 2013 in International Application No. PCT/JP2011/063850 to Sumitomo Chemical Co., Ltd., et al.

Japanese Office Action issued in counterpart JP Application No. P2011-134540, dated Jan. 6, 2015.

Communication from the Mexican Institute of Industrial Property issued Oct. 28, 2014 in a counterpart Mexican Application MX/a/2012/014260d.

European Office Action issued in counterpart EP Application No. 11795818.1, dated May 20, 2015.

Mexican Office Action issued in counterpart MX Application No. MX/a/2012/014260, dated Apr. 10, 2015.

European Office Action issued in counterpart EP Application No. 11795818.1, dated Aug. 12, 2015.

Office Action from the Mexican Institute of Industrial Property, mailed Oct. 26, 2015 in counterpart Mexican Patent Application No. MX/a/2012/014260.

* cited by examiner

EXTRUSION-MOLDING DEVICE AND METHOD FOR PRODUCING MOLDED BODY USING SAME

CROSS REFERENCE TO RELATED APPLICATIONS

This application is a National Stage of International Application No. PCT/JP2011/063850 filed Jun. 16, 2011, claiming priority based on Japanese Patent Application No. 2010-138351 filed Jun. 17, 2010, the contents of all of which are incorporated herein by reference in their entirety.

TECHNICAL FIELD

The present invention relates to a technique for producing a molded body, and more specifically, it relates to an extrusion-molding device for production of a ceramic molded body and to a method for producing a molded body using the same.

BACKGROUND ART

Honeycomb filter structures for DPF (Diesel Particulate Filters) are widely known in the prior art. Such honeycomb filter structures have a structure wherein some of the through-holes of a honeycomb structure having a plurality of through-holes have one of their sides plugged with a plugging material, while the other sides of the remaining through-holes are likewise plugged with a plugging material. In Patent documents 1 and 2 there are disclosed a die and extrusion-molding device to be used for production of a honeycomb structure.

CITATION LIST

Patent Literature

[Patent document 1] Japanese Unexamined Patent Application Publication No. 61-5915
[Patent document 2] Japanese Patent No. 4099896

SUMMARY OF INVENTION

Technical Problem

A honeycomb filter structure for DPF is usually used by being housed in a rigid case. If the dimensional precision of the honeycomb filter structure is low, troubles will tend to occur such as cracking in the honeycomb filter structure as a result of thermal stress. High dimensional precision is therefore required for green molded bodies before firing. A honeycomb structure has a narrow cell pitch (for example, about 1.1 to 2.8 mm), and high dimensional precision is also required for the thickness of the partitions defining the plurality of through-holes.

When a honeycomb structure is to be produced by extrusion molding, it is preferred for the pressure loss of the paste raw material composition flowing in the extrusion-molding device to be minimal. If pressure loss of the raw material composition is large, the load on the extrusion-molding device will be increased leading to problems such as wear of the parts, and it will become necessary to impose restrictions, such as setting a viscosity of the raw material composition low.

Having been devised in light of this situation, it is an object of the present invention to provide an extrusion-molding device that can reduce pressure loss associated with transport of a paste-like starting composition and that can produce a molded body with sufficiently high dimensional precision, as well as a method for producing a molded body using the same.

Solution to Problem

The extrusion-molding device of the invention comprises a flow passage for transporting a paste raw material composition, a screw provided at the upstream side of the flow passage to knead the raw material composition and transport it to the downstream side, a die provided at the downstream side of the flow passage to extrude a molded body composed of the raw material composition therefrom, a resistive tube for connecting the flow passage and die, and a current plate provided between the screw and die. The current plate has a plurality of through-holes that penetrate from the upstream end side to the downstream end side, and an opening of the through-hole on the upstream end side has a larger open area than an opening on the downstream end side.

According to the invention, increasing the size (the open area) of the openings on the upstream end side of the current plate to greater than the size of the openings on the downstream end side allows the paste raw material composition to pass through the through-holes of the current plate more easily and allows pressure loss of the current plate to be sufficiently reduced. By reducing pressure loss, it is possible to decrease the load on the extrusion-molding device and adequately minimize wear of the current plate. The current plate may have a mesh-like resistor to increase the rectifying effect.

According to the invention it is also possible to produce a molded body with excellent shape retention.

As mentioned above, the apparatus of the invention has a construction in which the opening of the through-hole on the upstream end side of the current plate have a larger open area than the opening on the downstream end side. Specific modes are the following. For example, the through-hole of the current plate may have a tapered section such that the open area increases from the downstream end toward the upstream end, or it may have a spot-faced hole at the upstream end.

The present invention provides a method for producing a molded body using the extrusion-molding device described above. According to the method of the invention it is possible to produce a molded body with excellent shape retention.

Preferably, the molded body being extruded or the pressure in the flow passage of the extrusion-molding device is checked, and when a problem is found, the current plate is replaced and/or the viscosity of the raw material composition is varied. For example, when the shape retention of the molded body being extruded is insufficient, the composition of the raw material is adjusted to increase the viscosity. In this case, the current plate is also preferably replaced as necessary. By adjusting the viscosity of the raw material composition and replacing the current plate, it is possible to reduce the load on the extrusion-molding device and to continuously produce a molded body with sufficiently high dimensional precision over a prolonged period.

Advantageous Effects of Invention

According to the invention it is possible to adequately reduce pressure loss of a raw material composition and to produce a molded body with sufficiently high dimensional precision.

BRIEF DESCRIPTION OF DRAWINGS

FIG. 4(a) is a plan view of an example of a current plate, and (b) is a partial cross-sectional view of one mode for the through-holes.

DESCRIPTION OF EMBODIMENTS

Preferred embodiments of the invention will now be explained in detail, with reference to the accompanying drawings. A green molded body for a honeycomb structure will be explained first, before Explanation of the Extrusion-Molding Device of the Invention.

<Green Molded Body>

Figure 1:
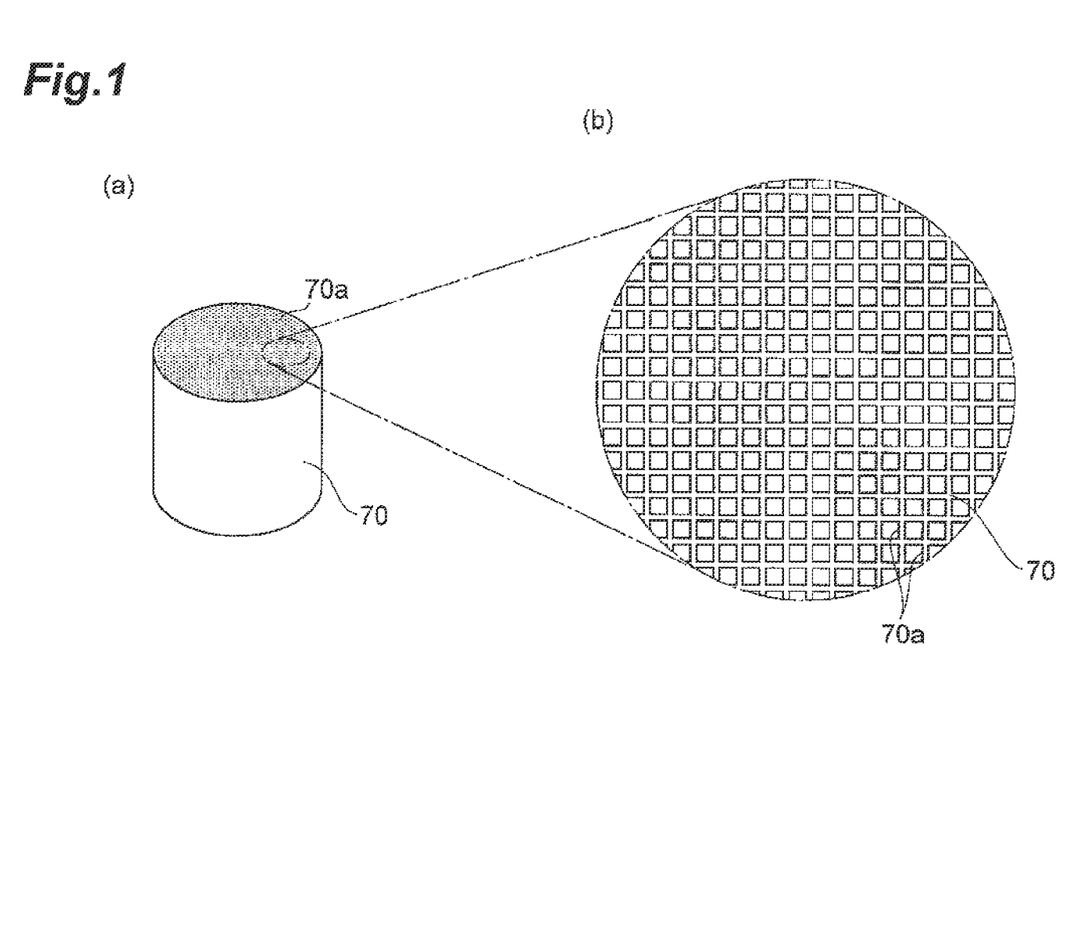
FIG. 1(a) is a perspective view showing one example of a green molded body for a honeycomb structure.
FIG. 1(b) is a partial magnified view of the green molded body.

The green molded body 70 shown in FIG. 1 is obtained by extrusion molding a raw material composition. As shown in FIG. 1(a), the green molded body 70 is a circular column having a plurality of through-holes 70a arranged in a substantially parallel manner. The cross-sectional shapes of the through-holes 70a are square, as shown in FIG. 1(b). As viewed from an end face, the plurality of through-holes 70a have a square arrangement for the green molded body 70, i.e. the central axes of the through-holes 70a are disposed so that they are positioned at the apexes of squares. The square shapes of the cross-sections of the through-holes 70a may have sizes with sides of 0.8 to 2.5 mm, for example. A honeycomb structure is produced by firing the green molded body 70 at a prescribed temperature.

There are no particular restrictions on the length of the through-holes 70a of the green molded body 70 in the direction of their extension, and it may be 40 to 350 mm, for example. There are also no particular restrictions on the outer diameter of the green molded body 70, and it may be 100 to 320 mm, for example.

There are no particular restrictions on the raw material composition forming the green molded body 70, but for production of a honeycomb structure for a DPF, it includes an inorganic compound source powder as the ceramic raw material, an organic binder such as methyl cellulose, and additives that are added as necessary. From the viewpoint of high-temperature resistance of the honeycomb structure, preferred ceramic materials include oxides such as alumina, silica, mullite, cordierite, glass and aluminum titanate, or silicon carbide, silicon nitride and the like. Aluminum titanate may further include magnesium and/or silicon.

For production of an aluminum titanate green molded body, for example, the inorganic compound source powder may include an aluminum source powder such as α-alumina powder, and a titanium source powder such as anatase or rutile titania powder, and if necessary also a magnesium source powder such as magnesia powder or magnesia spinel powder, and/or a silicon source powder such as silicon oxide powder or glass frit.

Organic binders include celluloses such as methyl cellulose, carboxylmethyl cellulose, hydroxyalkylmethyl cellulose and sodium carboxylmethyl cellulopluggcohols such as polyvinyl alcohol; and ligninsulfonic acid salts.

Examples of additives include pore-forming agents, lubricants, plasticizers, dispersing agents and solvents.

Pore-forming agents include carbon materials such as graphite; resins such as polyethylene, polypropylene and polymethyl methacrylate; plant materials such as starch, nut shells, walnut shells and corn; ice; and dry ice.

Lubricants and plasticizers include alcohols such as glycerin; higher fatty acids such as caprylic acid, lauric acid, palmitic acid, arachidic acid, oleic acid and stearic acid; stearic acid metal salts such as Al stearate; and polyoxyalkylenealkyl ethers (POAAE).

Examples of dispersing agents include inorganic acids such as nitric acid, hydrochloric acid and sulfuric acid; organic acids such as oxalic acid, citric acid, acetic acid, malic acid and lactic acid; alcohols such as methanol, ethanol and propanol; and surfactants such as ammonium polycarboxylate and polyoxyalkylenealkyl ethers.

Examples of solvents to be used include alcohols such as methanol, ethanol, butanol and propanol; glycols such as propylene glycol, polypropylene glycol and ethylene glycol; and water.

<Extrusion-Molding Device>

Figure 2:
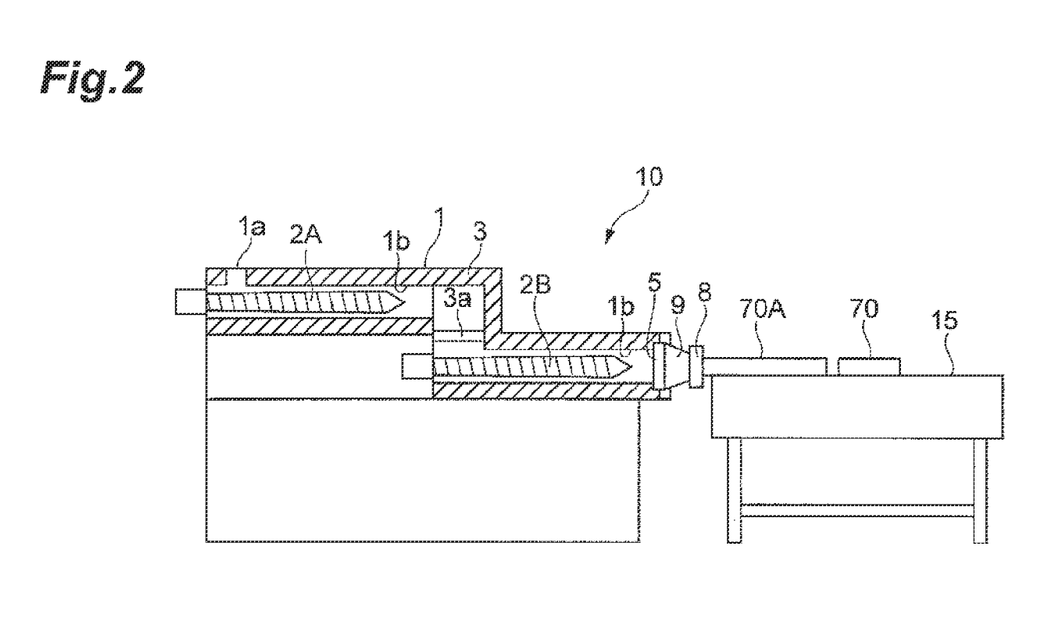
FIG. 2 is a simplified cross-sectional view showing an embodiment of an extrusion-molding device according to the invention.

Embodiments of the extrusion-molding device of the invention will now be explained with reference to FIGS. 2 to 4. The extrusion-molding device 10 shown in FIG. 2 is for production of a green molded body 70 from a powdered or paste raw material composition.

The extrusion-molding device 10 comprises a screw 2A provided in the upper level of a housing 1, and a screw 2B provided in the lower level. The screws 2A, 2B knead a paste raw material composition supplied through an entry port 1a, while transporting it through a flow passage 1b toward the downstream end. Between the screws 2A, 2B there is provided a vacuum chamber 3, with pressure reduction in the vacuum chamber 3 allowing deaerating treatment of the raw material composition. The raw material composition in the vacuum chamber 3 is introduced into the lower level screw 2B by a roller 3a.

The extrusion-molding device 10 further comprises a current plate 5 provided at the downstream end of the screw 2B, a die 8 through which the molded body 70A composed of the raw material composition is extruded, and a resistance tube 9 connecting the fluid channel 1b and the die 8. The resistance tube 9 has a tapered interior fluid channel, with the cross-sectional area of the flow passage gradually decreasing from the upstream end toward the downstream end. For production of a molded body 70A having a larger diameter than the diameter of the screw 2B, the resistance tube 9 may have an enlarged section in which the flow passage cross-section increases from the upstream end toward the downstream end. In order to prevent deformation of the molded body 70A that has been extruded from the die 8, a support stage 15 for support of the molded body 70A is situated next to the extrusion-molding device 10.

The current plate 5 is designed to homogenize the flow rate distribution before the raw material composition is introduced into the die 8. Usually, the raw material composition flowing near the inner wall side of the flow passage 1b has a low flow rate while the raw material composition flowing at the center section of the flow passage 1b has a high flow rate. If a green molded body for a honeycomb structure is produced by extrusion of the raw material composition from the die 8 with this flow rate distribution, the partitions at the center section of the green molded body will be thicker than the other sections, causing the problem of bending of the partitions. Also, if the flow rate of the raw material composition passing through the die 8 is non-homogeneous, the material composing the die 8 will undergo wear in a non-homogeneous manner, not only causing lower dimensional precision for the molded body, but also significantly shortening the usable life of the die 8 as portions of the die 8 preferentially undergo wear.

The current plate 5 is provided in a detachable manner with respect to the housing 1, and it is disposed between the screw 2B and the die 8. The current plate 5 may have a mesh-like resistor (not shown) to increase the effect of flow control.

Figure 3:
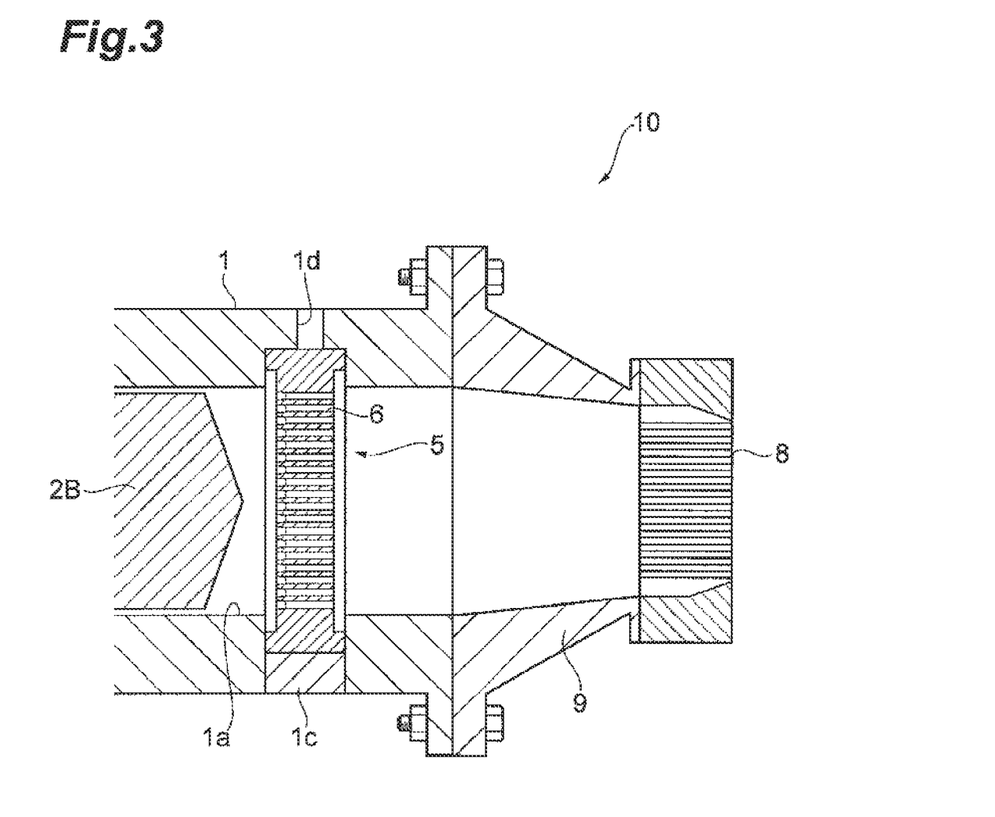
FIG. 3 is a partial cross-sectional view schematically showing the internal structure of the extrusion-molding device of FIG. 2.

When the current plate 5 is to be removed from the housing 1, first a lower presser plate 1c is removed and a tool is screwed in through an upper threaded hole 1d to slide the current plate 5 downward (see FIG. 3). Instead of a type that uses a tool, the mechanism for sliding the current plate 5 may be an oil pressure-utilizing type.

The current plate 5 is preferably a structure that undergoes essentially no strain even when under pressure from the upstream end. From this viewpoint, the material of the current plate 5 is preferably carbon steel, for example. Examples of preferred materials other than carbon steel include special steel comprising nickel, chromium, tungsten or the like. The thickness of the current plate 5 is preferably 10 to 100 mm, from the viewpoint of ensuring sufficient strength.

Figure 4:
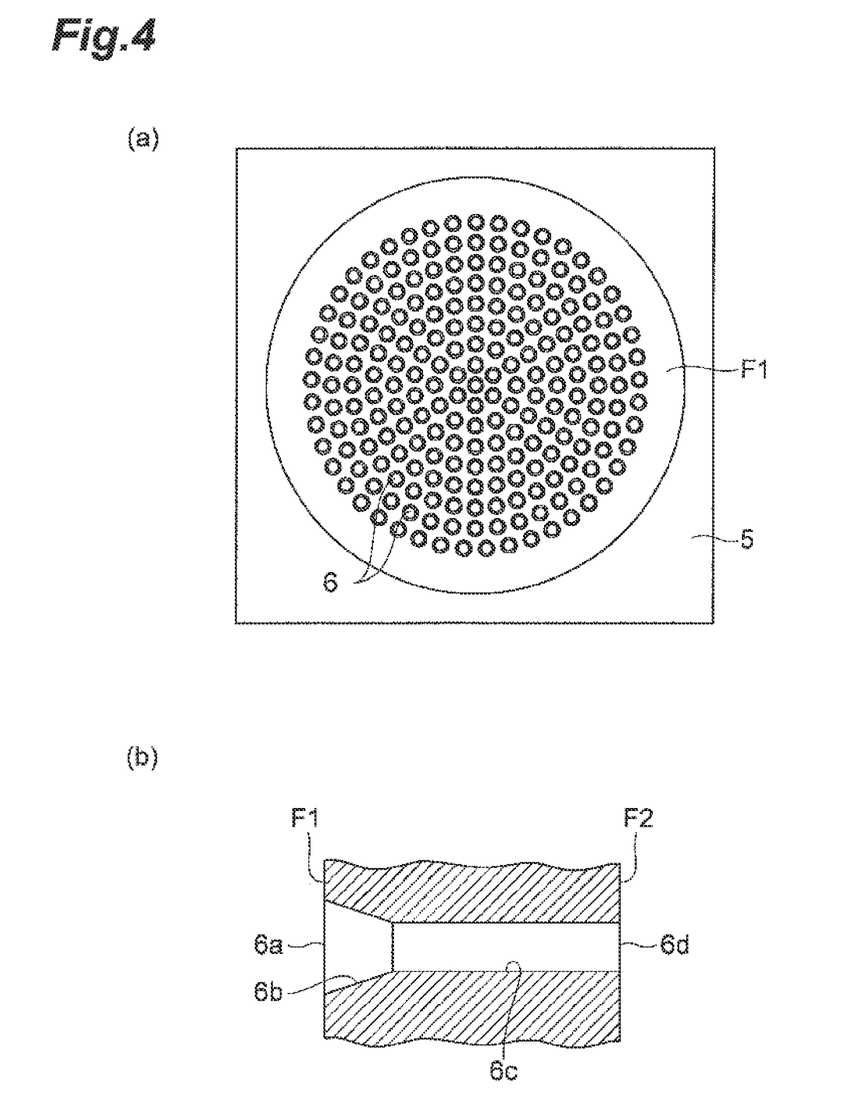

FIG. 4(a) is a front view of a current plate 5, and FIG. 4(b) is a partial cross-sectional view of the structure of a through-hole 6 of the current plate 5. As shown in FIG. 4, the current plate 5 has a plurality of through-holes 6 running through from the upstream end side F1 to the downstream end side F2. Each of the through-holes 6 has a tapered section 6b wherein the inner diameter decreases from the upstream end opening 6a toward the downstream end, and a straight-tube section 6c at the downstream end. Thus, the open area of the opening 6a at the upstream end of the through-hole 6 is greater than the open area of the opening 6d at the downstream end.

From the viewpoint of sufficiently reducing pressure loss of the starting composition, the opening 6a at the upstream end of the through-hole 6 preferably has a diameter of 3 to 12 mm. Also, the opening 6d at the downstream end of the through-hole 6 preferably has a diameter of 1 to 10 mm.

The open area ratio on the upstream end side F1 of the current plate 5 is preferably 60-100%, more preferably no greater than 98%, and even more preferably no greater than 95%. Also, the open area ratio on the downstream end side F2 of the current plate 5 is preferably 50-80%. If the current plate 5 used has an excessively small open area ratio on side F1 or side F2, it will not be possible for a sufficient amount of the raw material composition to pass through per unit time unless the pressure at the upstream end is excessively increased, and the pressure will tend to increase above the allowable pressure for the apparatus. On the other hand, a current plate 5 with an excessively large open area ratio on side F2 will tend to have insufficient strength.

The term "open area ratio" used here means the value calculated by dividing the total area of the openings on one side of the current plate 5 (side F1 or side F2) by the area of that one side (excluding the perimeter covered by the housing).

The die 8 serves to produce a molded body with the shape shown in FIG. 1 from the raw material composition, and it has a corresponding lattice-like fluid channel (not shown). A die used to produce a molded body with a cell structure such as that of the green molded body 70 requires a dense fluid channel to be set, and is generally expensive. The frequency of die replacement is therefore preferably as low as possible. With this embodiment, the flow rate of the raw material composition is homogenized by the current plate 5, thereby extending the usable life of the die 8 and allowing the frequency of replacement to be reduced.

<Method for Producing Green Molded Body>

A method of producing the green molded body 70 using the extrusion-molding device 10 will now be described. First, a raw material composition is introduced into the flow passage 1b through the entry port 1a. By actuating the screws 2A, 2B and roller 3a, the raw material composition is kneaded while being transported to the downstream end. The kneaded blend passes through the through-holes 6 of the current plate 5, thus homogenizing the flow rate distribution, and it is then introduced into the die 8 through the resistance tube 9. The linear speed of the raw material composition at the downstream end of the die 8 may be about 10 to 150 cm/min.

The raw material composition with homogenized flow rate distribution is extruded from the die 8 and the molded body 70A is collected on the support stage 15. The molded body 70A is cut to a prescribed length to obtain a green molded body 70.

When the shape retention of the molded body is insufficient, it is preferred to supply a raw material composition with increased viscosity to the extrusion-molding device 10. This can improve the shape retention of the molded body. The current plate 5 is preferably replaced when pressure loss of the raw material composition in the extrusion-molding device 10 becomes excessively high after the viscosity of the raw material composition has been increased. By replacement with a current plate having an appropriate open area ratio, it is possible to reduce the load on the extrusion-molding device 10.

When a problem has been found that is attributable to non-homogeneity of the flow rate distribution of the raw material composition, the following step may be carried out. The step may involve, for example, removing the current plate 5 from the housing 1, and inserting a pin (not shown) into one or more through-holes 6 to occlude the through-holes 6 and adjust the flow rate. By carrying out such steps, it is possible to continuously produce a green molded body 70 with sufficiently high dimensional precision over long periods, without altering the setting of or replacing the die 8. The steps may be accomplished after temporarily halting supply of the raw material composition to the extrusion-molding device, or without halting the supply.

Providing through-holes 6 of the described mode in the current plate 5 according to this embodiment can sufficiently reduce pressure loss of the starting composition in the current plate 5. By reducing pressure loss, it is possible to decrease the load on the extrusion-molding device 10 and adequately minimize wear of the current plate 5. Also, since it is possible, according to this embodiment, to prevent excessive increase in pressure loss even when using a raw material composition with relatively high viscosity, a raw material composition of suitable viscosity may be used to obtain a molded body with high shape retention.

Figure 5:
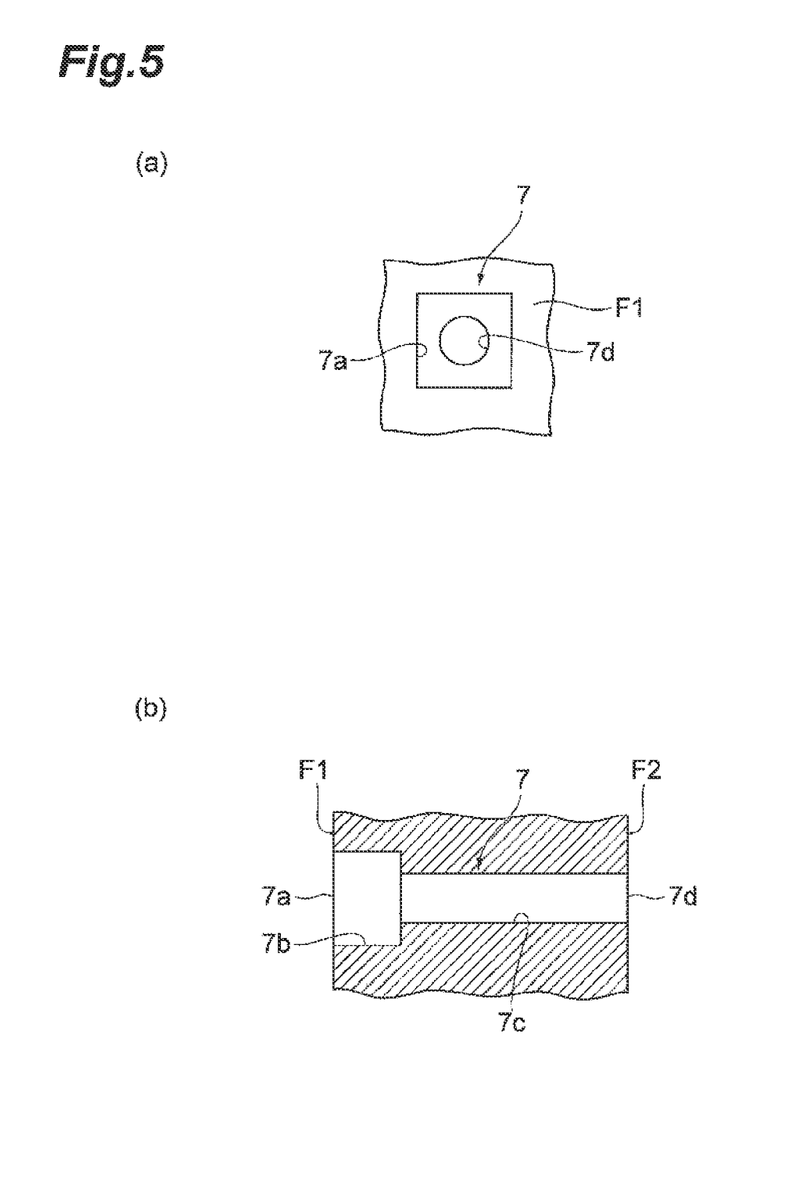
FIG. 5(a) is a partial front view of a current plate in which a through-hole with a spot-faced hole is formed.
FIG. 5(b) is a partial cross-sectional view of the structure of the through-hole.

The above detailed explanation of a preferred embodiment of the invention is not intended to restrict the scope of the invention to this embodiment. For example, the aforementioned embodiment is an example with through-holes 6 having tapered sections 6b, but the through-holes may have spot-faced holes on the upstream end instead of tapered sections 6b. FIG. 5(a) is a partial front view of a current plate in which a through-hole 7 with a spot-faced hole is formed, and FIG. 5(b) is a partial cross-sectional view of the structure of the through-hole 7. As shown in FIG. 5, the through-hole 7 has a rectangular upstream end opening 7a, a spot-faced hole 7b, a straight-tube section 7c with a substantially circular fluid channel cross-section, and a substantially circular downstream end opening 7d. The shape of the spot-faced hole 7b is not limited to a rectangular shape, and may be circular, elliptical or polygonal.

This embodiment is an example in which all of the through-holes 6 of the current plate 5 are such that the size (open area) of the upstream end opening 6a is larger than the size of the downstream end opening 6d (open area), but through-holes 6 with such a structure may be used in combination with straight-tube through-holes. In most cases, the raw material composition flowing near the inner wall side of the fluid channel has a low flow rate while the raw material composition flowing through the center section of the fluid channel has a high flow rate, and therefore from the viewpoint of homogenizing the flow rate, straight-tube through-holes may be provided in the center region of the current plate 5 while through-holes having tapered sections 6b or spot-faced holes 7b may be provided in the peripheral region of the current plate 5. Also, considering the center location of the current plate 5 to be the center of a circle, straight-tube through-holes or through-holes with tapered sections 6b or spot-faced holes 7b may be provided in the current plate in such a manner as to be maldistributed within a prescribed central angle.

This embodiment is an example with a mechanism for sliding the current plate 5 with respect to the housing 1, but the mechanism by which the current plate 5 is detachable with respect to the housing 1 is not limited thereto. For example, the location in which the current plate 5 of the housing 1 is set may be one that can be freely opened and closed, allowing the current plate 5 to be anchored in the housing 1 by anchoring means such as a bolt and nut.

Moreover the aforementioned embodiments are examples with a circular column green molded body 70, but the shape and structure of the molded body is not limited thereto. The outer shape of the green molded body 70 may be rectangular columnar, such as square columnar, or elliptic cylindrical, for example. Also, the arrangement of the through-holes 70a does not need to be a square arrangement, and may instead be a substantially triangular arrangement or substantially hexagonal arrangement, for example. In addition, the shapes of the through-holes 70a do not need to be square, and may instead be substantially triangular, substantially hexagonal, substantially octagonal or substantially circular.

INDUSTRIAL APPLICABILITY

According to the invention it is possible to adequately reduce pressure loss of a paste raw material composition and to produce a molded body with sufficiently high dimensional precision.

REFERENCE SIGNS LIST

1: Housing, 1b: flow passage, 2B: screw, 5: current plate, 6, 7: through-holes, 6a, 7a: upstream end openings, 6b: tapered section, 6c, 7c: straight-tube sections, 6d, 7d: downstream end openings, 7b: spot-faced hole, 8: die, 9: resistance tube, 10: extrusion-molding device, 70: green molded body, 70A: molded body, F1: upstream end side of current plate, F2: downstream end side of current plate.

The invention claimed is:

1. An extrusion-molding device comprising:
a flow passage for transporting a paste raw material composition;
a screw provided at an upstream side of the flow passage to knead the raw material composition and transport it to a downstream side;
a die provided at a downstream side of the flow passage to extrude a molded body composed of the raw material composition therefrom;
a resistive tube for connecting the flow passage and the die; and
a current plate provided between the screw and the die,
wherein the current plate comprises a plurality of through-holes that penetrate from an upstream end side to a downstream end side and that have spot-faced holes with rectangular cross-sections on upstream ends so that each of the through-holes has a rectangular upstream end opening, a spot-faced hole, a straight-tube section with a substantially circular cross-section, and a substantially circular downstream end opening, and the opening of the through-hole on the upstream end side has a larger open area than the opening on the downstream end side.

2. A method for producing a molded body using an extrusion-molding device comprising:
introducing a paste raw material composition into an upstream side of the extrusion-molding device; and
removing a molded body from a downstream side of the extrusion-molding device;
the extrusion-molding device comprising:
a flow passage for transporting the paste raw material composition;
a screw provided at an upstream side of the flow passage to knead the raw material composition and transport it to a downstream side;
a die provided at the downstream side of the flow passage to extrude a molded body composed of the raw material composition therefrom;
a resistive tube for connecting the flow passage and the die; and
a current plate provided between the screw and the die,
wherein the current plate comprises a plurality of through-holes that penetrate from an upstream end side to a downstream end side and that have spot-faced holes with rectangular cross-sections on upstream ends so that each of the through-holes has a rectangular a upstream end opening, a spot-faced hole, a straight-tube section with a substantially circular cross-section, and a substantially circular downstream end opening, and the opening of the through-hole on the upstream end side has a larger open area than the opening on the downstream end side.

3. The method according to claim 2, comprising a step of replacing the current plate of the extrusion-molding device.

4. The method according to claim 2, comprising a step of varying a viscosity of the raw material composition.

5. The method according to claim 2, wherein the depth of each spot-faced hole is substantially equal.

* * * * *